A. J. LAST.
PEDAL GUARD FOR MOTOR CARS AND OTHER VEHICLES.
APPLICATION FILED FEB. 13, 1908.
913,406.
Patented Feb. 23, 1909.
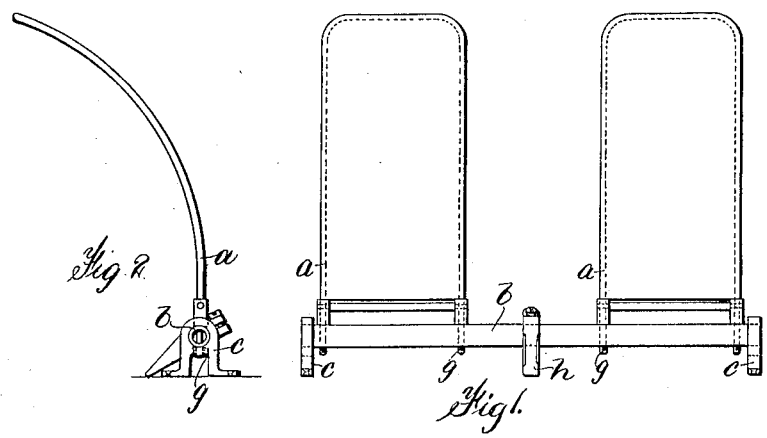
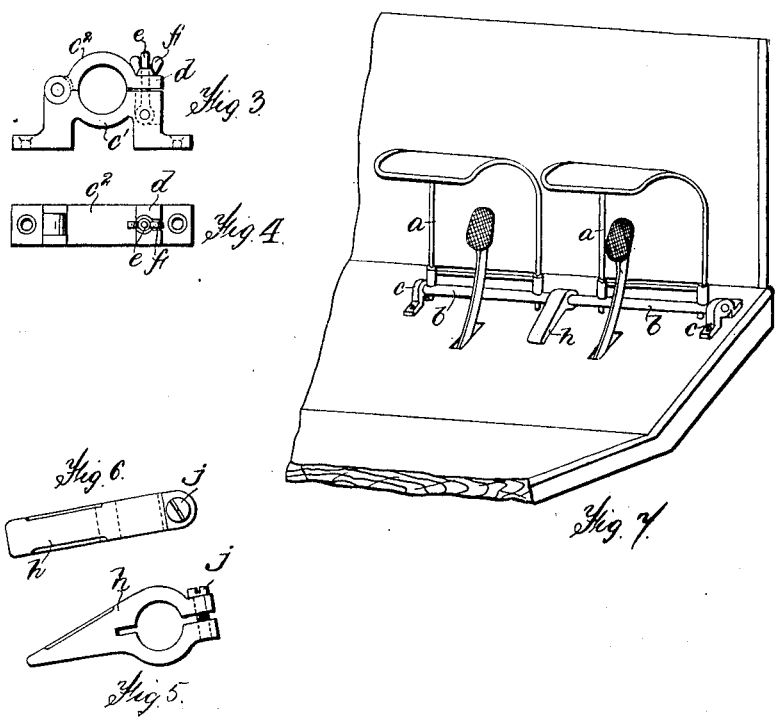

UNITED STATES PATENT OFFICE.

ARTHUR JOHN LAST, OF DOVERCOURT, ENGLAND.

PEDAL-GUARD FOR MOTOR-CARS AND OTHER VEHICLES.

No. 913,406.   Specification of Letters Patent.   Patented Feb. 23, 1909.

Application filed February 13, 1908. Serial No. 415,776.

*To all whom it may concern:*

Be it known that I, ARTHUR JOHN LAST, a subject of the King of England, residing at Marine View, Cliff Road, Dovercourt, in the county of Essex, England, have invented certain new and useful Improvements in and Relating to Pedal-Guards for Motor-Cars and other Vehicles; and I do hereby declare the following to be a full, clear, and exact description of the invention, such as will enable others skilled in the art to which it appertains to make and use the same.

This invention refers to a guard or screen for motor cars and other vehicles.

As is well known to drivers of self-propelled vehicles, considerable trouble and discomfort are occasioned in the use of an apron, rug or the like, in consequence of the liability of the apron or the like fouling the pedals etc., thus making it difficult to properly protect the feet of the driver or passenger in front.

My invention has for its object the construction of a cheap and efficient guard, with which an apron can be used with ease and comfort, and without the chance of its fouling the pedals, etc.

According to my invention, I make a screen, composed of a plate or frame of any suitable material, and so attach the same to the foot-board, floor, dashboard, or other suitable part of the vehicle, that the screen, which is preferably curved, inclines upwards, say, over the pedals, and enables the apron or rug to be supported so that there is no chance of its fouling the pedals etc. while the legs of the driver or passenger are well protected from rain, dust, wind etc.

In one particular way of constructing my screen or guard, I form it from a suitably curved frame or plate, which is secured along the lower edge to a tube or rod. The ends of this rod or tube extend beyond the frame or plate and fit removably into bearings, brackets or the like, attached to a suitable part of the vehicle; so that when in position the frame or plate extends over the pedals. The plate is kept in an upright position by means of a lever adjustably attached at one end to any suitable part of the rod or tube, such lever being preferably adjusted by means of a set screw or clamping screw and bearing at the other end on the floor or other suitable part of the vehicle, thus keeping the guard in the required position.

Various modifications may be made in my guard without departing from the principle of my invention. For instance, in some cases I may make slots, openings etc. in various parts of the guard to enable the steering post or other parts in different makes of cars to pass through. And in order that my said invention may be better understood I will proceed to describe the same with reference to the drawing accompanying this specification, in which:—

Figure 1 shows front elevation of a guard constructed according to my invention; Fig. 2 shows side elevation; Figs. 3 to 6 show details hereinafter referred to. Fig. 7 shows a perspective view of one form of a guard constructed according to my invention, in position.

The same letters of reference are employed to denote the same parts in all the views:—

$a, a$ show frames which may be covered with patent leather or other suitable material. These frames are connected at their lower ends to a tube or spindle $b$, which tube or spindle $b$ is carried by bearings $c, c$. These bearings may be of ordinary construction or they may be constructed as shown at Figs. 3 and 4. In these figures the lower portion $c^1$ of the bearing has hinged to it a portion $c^2$ which is provided with a perforated lug $d$.

$e$ is a screw bolt pivoted to the lower portion $c^1$ of the bearing and $f$ is a fly nut which can be screwed on to the screw bolt $e$ after the spindle or tube $b$ has been inserted in order to enable same to be easily removed when the guard is not required. I prefer to flatten out or enlarge the end of the screw bolt $e$ after the fly nut $f$ has been screwed thereon so that it cannot be again entirely screwed off in order that there may be no likelihood of losing same.

The ends of the frames $a$ pass through the spindle or tube $b$ and are attached to the said spindle or tube $b$ by means of split pins $g$.

$h$ is a lever which is shown in detail at Figs. 5 and 6. This lever $h$ clamps around the spindle or tube $b$ and when suitably adjusted is fixed in position by means of the clamping screw $j$. It will be seen that the said lever $h$ can be adjusted on the spindle or tube $b$ in such a way that by pressing against, say, the floor or dashboard of the car, the frames $a$ and consequently the guard are held at any required angle.

It will be understood that the guard may be used with an ordinary or special apron, and in practice I find it convenient to attach the apron by means of a ring fitted at the center near its top edge, in the manner of aprons used in dog carts, between the driver's and front passenger's seats so that the apron is not disturbed when either the driver or passenger alights except by one of the sides being turned back to permit of the dismounting, or in some cases I may provide an apron with a hole through which the steering post passes; with a suitable flap, fastened by buttons or the like, which can be opened to enable the steering post to be passed into the hole, when the apron is adjusted in position.

It will be evident that the details of the construction may be modified in various ways without departing from the principle of the invention, for instance, the brackets carrying the spindle need not necessarily be at the extreme end of the spindle as they can be placed within the width of the guard. Again the adjusting lever can be fitted in any position along the spindle which may be found most convenient. In some cases the frame may be attached to the dashboard instead of to the floor of the car, or blocks or the like may be used upon which the frame is mounted, where it is necessary to raise the same in order to allow for free manipulation of the pedals, and other modifications in detail may be introduced when found necessary.

What I claim and desire to secure by Letters Patent of the United States of America is:—

The combination of curved guards for the pedals of an automobile, supports for said guards, and an adjustable lever which may be secured in different positions, for adjusting said guards backward and forward with relation to the pedals, substantially as described.

In testimony whereof, I affix my signature, in presence of two witnesses.

ARTHUR JOHN LAST.

Witnesses:
 A. E. VIDAL,
 LILY SIMONDS.